United States Patent
Sasagawa et al.

(10) Patent No.: US 6,613,858 B1
(45) Date of Patent: Sep. 2, 2003

(54) SOLUTION OF DILITHIUM POLYMERIZATION INITIATOR

(75) Inventors: Masahiro Sasagawa, Kanagawa (JP); Jurgen Hofmans, Heverlee (BE); Marcel Van Beylen, Heverlee (BE)

(73) Assignee: Asahi Kasei Kabushiki Kaisha, Osaka (JP)

(*) Notice: Subject to any disclaimer, the term of this patent is extended or adjusted under 35 U.S.C. 154(b) by 0 days.

(21) Appl. No.: 09/959,431

(22) PCT Filed: Feb. 28, 2000

(86) PCT No.: PCT/JP00/01150

§ 371 (c)(1), (2), (4) Date: Jan. 10, 2002

(87) PCT Pub. No.: WO01/64758

PCT Pub. Date: Sep. 7, 2001

(30) Foreign Application Priority Data

Aug. 31, 1998 (JP) ............................................. 10-259116
Aug. 31, 1998 (JP) ............................................. 10-259117

(51) Int. Cl.$^7$ ........................... C08F 236/10; C08F 4/48
(52) U.S. Cl. ....................... 526/340; 526/173; 526/335; 525/331.9; 525/332.9; 502/157; 260/665 R
(58) Field of Search ........................... 502/157; 526/173, 526/335, 340; 525/331, 9, 332.9; 260/665 R

(56) References Cited

U.S. PATENT DOCUMENTS

| | | | |
|---|---|---|---|
| 4,067,917 A | 1/1978 | Sigwalt et al. | |
| 5,462,994 A | * 10/1995 | Lo et al. | 526/173 X |
| 5,674,799 A | 10/1997 | Nugay et al. | |

FOREIGN PATENT DOCUMENTS

| | | |
|---|---|---|
| EP | 0 001 977 | 5/1979 |
| JP | 60-155204 | 8/1985 |
| JP | 2000-72808 | 3/2000 |
| JP | 2000-72837 | 3/2000 |

OTHER PUBLICATIONS

Yu, et al, "Efficiency of the sec–Butyllithium/m–Diisopropenylbenzene Diadduct as an Anionic Polymerization Initiator in Apolar Solvents," Macromolecules, 1994, 27, 5957–5963.*

* cited by examiner

*Primary Examiner*—Fred Teskin
(74) *Attorney, Agent, or Firm*—Birch, Stewart, Kolasch & Birch, LLP

(57) ABSTRACT

A block copolymer having narrow molecular weight distribution and excellent symmetrical property or a telechelic polymer having, equally at both terminals thereof, a functional group can be produced by using a polymerization initiator solution which comprises a dilithium polymerization initiator having an average number of functional groups of 1.8 to 2.0/molecule and a solvent selected from aliphatic hydrocarbon compounds and alicyclic compounds and is free of a polar substance.

7 Claims, No Drawings

SOLUTION OF DILITHIUM POLYMERIZATION INITIATOR

This application is the national phase under 35 U.S.C. §371 of PCT International Application No. PCT/JP00/01150 which has an International filing date of Feb. 28, 2000, which designated the United States of America and was not published in English.

TECHNICAL FIELD

The present invention relates to a novel dilithium polymerization initiator solution useful for the production of a block copolymer having narrow molecular weight distribution and excellent symmetric property or a telechelic polymer having, equally at both terminals thereof, a functional group, and relates to a production process thereof.

BACKGROUND ART

An attempt has long been made to polymerize a block copolymer having an SBS structure or SIS structure by using a dilithium compound as a polymerization initiator. This attempt has not always lead to practical industrial production. One of the reasons resides in that a polymerization initiator cannot be constituted of a dilithium compound alone. A polymer obtained using a polymerization initiator solution composed of many components involves such a drawback as inferior mechanical properties for example tensile strength, because such a polymer inevitably has a widened molecular weight distribution, and because polymerization proceeds only at one of the polymerization starting points of the dilithium compound, thereby making the resulting polymer to inevitably contain a copolymer having a diblock structure. Another reason resides in that in order to heighten a solubility of the dilithium compound in a nonpolar solvent and moreover to prepare a polymerization initiator as another-component free as possible, use of a sufficient amount of a polar substance containing a nitrogen or oxygen atom is indispensable during the preparation step of the polymerization initiator. This imposed a limitation on the bonding structure of a polymer in the subsequent polymerization step of a conjugated diene, resulting in the production of only a polymer having a large 1,2-vinyl-bound content. In addition, the polymer solution thus obtained cannot be provided for the subsequent reaction without any convenience. For example, upon hydrogenation reaction of the polymer, a tertiary amine compound, which is a nitrogen-containing compound among such polar substances, causes damage to a catalyst for hydrogenation of a conjugated diene polymer so that the polymer solution cannot be provided as is for hydrogenation.

For example, JP-B-63-5403 (The term "JP-B" as used herein means an "examined Japanese patent publication") discloses a process for producing a polymer having narrow molecular weight distribution by using a dilithium polymerization initiator. JP-B-1-53681 or JP-B-6-67990 discloses a dilithium polymerization initiator for obtaining a polymer having narrow molecular weight distribution. The techniques disclosed in them are for obtaining a dilithium polymerization initiator by reacting a monolithium compound with 1,3-diisopropenylbenzene in the presence of a tertiary amine.

JP-A-8-48709 (EP690075A1) (The term "JP-A" as used herein means an "unexamined Japanese patent application"), discloses an improvement of the above-described polymerization process using a dilithium polymerization initiator. As the polymerization initiator, described is an $\alpha,\omega$-dilithiopoly (conjugated diene) which is an oligomer obtained by reacting a monolithium compound with 1,3-diisopropenylbenzene in the presence of a tertiary amine and then reacting with a small amount of a conjugated diene. The object and means of the invention described above are to provide a polymer having narrow molecular weight distribution by forming an $\alpha,\omega$-dilithiopoly(conjugated diene) from the dilithium compound thus obtained and a small amount of the conjugated diene and carrying out polymerization using this conjugated diene oligomer as a polymerization initiator. This process needs complex steps. A number of patent official gazettes and references were introduced in it as a prior art.

In the above-described prior art, a tertiary amine is used as an essential component so that, as described above, the polymer solution cannot be provided for hydrogenation reaction as is. In addition, many restrictions are imposed on it, for example, use of an oligomer polymerization initiator to control the initiation of the polymerization reaction, a decrease in the amount of the conjugated diene at the initial stage of the reaction and use of the polymerization initiator at a predetermined concentration.

"Macromolecules, 27, 2219–2255 (1994)" discloses a lithium polymerization initiator synthesized using sec-BuLi which initiator is soluble in toluene, cyclohexane or n-hexane and that a block copolymer can be prepared using this polymerization initiator. This system free of a polar substance, however, has a low polymerization rate and moreover, a polymer obtained using it does not have sufficiently narrow molecular weight distribution.

It is already known that use of durene, which is a $\pi$ electron donor, in anionic polymerization changes the polymerization rate of styrene. According to J. of Polymer Science, Part A, 3, 1037–1044 (1965), when the molar ratio of durene to an active terminal Li is 1:5, the polymerization rate of styrene becomes about twice the rate of a durene-free case, suggesting the formation of a $\pi$ complex by durene. It however includes neither an attempt to prepare a dilithium polymerization initiator by using durene nor an attempt to polymerize a conjugated diene by positively using a dilithium polymerization initiator prepared using durene in anionic polymerization.

An object of the present invention is to provide a dilithium polymerization initiator solution which is useful for the preparation of a block copolymer having narrow molecular weight distribution and excellent symmetric property or the preparation of a telechelic polymer having, equally at both terminals thereof, a functional group, and which is free of a nitrogen- or oxygen-containing polar substance. Another object of the invention is to prepare a (co)polymer having narrow molecular weight distribution by using the above-described polymerization initiator solution as it is. A further object of the invention is to obtain, when a conjugated diene is employed as a monomer, a polymer having a low content of a 1,2-bound structure in the conjugated diene polymer portion. A still further object of the invention is to obtain a novel telechelic polymer by reacting the (co)polymer with a functional-group-imparting compound.

DISCLOSURE OF THE INVENTION

The present inventors have carried out an extensive investigation with a view toward overcoming the above-described drawbacks of a dilithium polymerization initiator solution and production of a (co)polymer using the solution. As a result, they succeeded in the completion of the following invention.

In one aspect of the invention, there is thus provided a polymerization initiator solution which comprises a dilithium polymerization initiator having an average number of functional groups of from 1.8 to 2.0/molecule and a solvent selected from aliphatic hydrocarbon compounds and alicyclic compounds, and which is free of a polar substance and a conjugated diene.

In another aspect of the invention, there is also provided a production process of the above-described polymerization initiator solution, which comprises reacting, in a solvent selected from aliphatic hydrocarbon compounds and alicyclic compounds, a mono-organo lithium compound and a compound having two vinyl groups directly bonded to a benzene ring in the presence of at least one compound selected from benzene compounds substituted with at least three alkyl groups and 1,1-diphenyl-substituted ethylene compounds.

In a further aspect of the invention, there is also provided a production process of the above-described polymerization initiator solution, wherein the benzene compound substituted with at least three alkyl groups is 1,2,4,5-tetramethylbenzene (durene) or hexamethylbenzene and the 1,1-diphenyl-substituted ethylene compound is tetraphenylethylene.

In a still further aspect of the invention, there is also provided a production process of the above-described polymerization initiator solution, wherein the compound having two vinyl groups directly bonded to a benzene ring is 1,3-diisopropenylbenzene or divinylbenzene.

In a still further aspect of the invention, there is also provided a production process of a co(polymer), which comprises polymerizing a conjugated diene or a conjugated diene and an aromatic vinyl compound in a nonpolar hydrocarbon solvent by using the above-described polymerization initiator solution.

In a still further aspect of the invention, there is also provided a copolymer obtained by the above-described process.

In a still further aspect of the invention, there is also provided a telechelic polymer obtained by reacting a functional-group-imparting compound with the active terminal of the (co)polymer polymerized by the above-described process.

BEST MODE FOR CARRYING OUT THE INVENTION

The term "average number of functional groups" as used herein means a hydroxyl value measured in accordance with the following method. By using a polymerization initiator solution to be measured, 1,3-butadiene is polymerized and the resulting living polymer is reacted with 2 equivalents of dry ethylene oxide. After the reaction mixture is allowed to stand for 24 hours at room temperature, a 1N aqueous HCl solution is added to neutralize the reaction mixture. The neutralized mixture is washed with water and then separated to obtain an organic layer. The solvent is removed by thin-film evaporation, whereby a liquid oligomer is obtained. The hydroxyl value of this oligomer measured in accordance with JIS K 0070-1992 is designated as the average number of functional groups. The average number of functional groups of the dilithium polymerization initiator solution of the invention is 1.8 to 2.0/molecule, preferably 1.85 to 2.0/molecule, more preferably 1.9 to 2.0/molecule. The average number of functional groups within the above-described range indicates uniformity of the dilithium polymerization initiator. As the number approaches 2.0/ molecule, the block copolymer obtained by using the initiator shows better symmetrical property and better mechanical properties. Similarly, use of this polymerization initiator makes it possible to provide a telechelic polymer having, equally at both terminals thereof, functional groups.

The dilithium polymerization initiator solution of the invention is obtained, for example, by reacting an mono-organo lithium compound and a compound having two vinyl groups directly bonded to a benzene ring at a molar ratio of 2:1 in an aliphatic hydrocarbon compound or alicylic compound in the presence of a benzene compound substituted with at least three alkyl groups or a 1,1-diphenyl-substituted ethylene compound.

As the solvent for the polymerization initiator solution, $C_{4-8}$ aliphatic hydrocarbons, alicyclic hydrocarbons and mixtures thereof are usable, with the cyloalkanes, particularly cyclohexane and cyclopentane, being preferred.

Upon production of the dilithium polymerization initiator, a polar substance, for example, a tertiary amine such as triethylamine or trimethylamine or an ether compound such as THF should not be incorporated. Such a substance causes various problems during polymerization as described above. The present invention is characterized by that a uniform dilithium polymerization initiator free of problems due to a polar substance can be provided.

Examples of the mono-organo lithium compound include n-butyl lithium, sec-butyl lithium, tert-butyl lithium, 2-methyl-propyl lithium and i-propyl lithium. Of these, sec-butyl lithium and tert-butyl lithium are preferred, with tert-butyl lithium being most preferred.

The term "compound having two vinyl groups directly bonded to a benzene ring" means a compound having two vinyl groups on the same benzene ring or different benzene rings. Examples of it include compounds represented by the following formula:

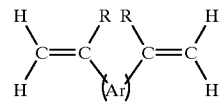

wherein, R represents a hydrogen atom or a group selected from methyl, ethyl, phenyl and alkyl-substituted phenyl groups, and (Ar) represents a divalent aliphatic alicyclic or aromatic group, with the proviso that when (Ar) is an aliphatic or alicyclic group and is bonded to a carbon-to-carbon double-bond, R represents a phenyl or alkyl-substituted phenyl group.

Specific examples of (Ar) include p-phenylene, m-phenylene, p,p'-phenylene ether, p,p-diphenylene, p,p'-diphenylpropane and 1,8-octylene group.

Specific examples of such a compound having two vinyl groups directly bonded to a benzene ring include 1,3-diisopropenylbenzene, divinylbenzene, 1,3-di(1-phenylethenyl)benzene, 1,3-di[1-(methylphenyl)ethenyl)]benzene and 2,11-diphenyl-dodeca-1,11-diene. Of these, 1,3-diisopropenylbenzene and divinylbenzene are especially preferred.

Examples of the benzene compound substituted by at least three alkyl groups include 1,2,4,5-tetramethylbenzene (durene), hexamethylbenzene and 1,3,5-trimethylbenzene (mesitylene), of which the 1,2,4,5-tetramethylbenzene (durene) is particularly preferred. As the 1,1-diphenyl-substituted ethylene compound, tetraphenylethylene is preferred. These compounds are presumed to take part in association with an organolithium compound or a lithium ion exhibiting polymerization activity and have action to partially dissociate the association.

These benzene compound substituted with at least three alkyl groups and 1,1-diphenyl-substituted ethylene compounds are each added at a molar ratio of 1/10 to 1000/1 relative to the mono-organo lithium compound. The optimum range differs with the compound employed. For example, a molar ratio when durene is employed is 1/10 to 1000/1, which is however limited by the solubility in a solvent to be employed. The reaction temperature may be −20 to 60° C., preferably 20 to 50° C.

Raw materials and solvent used for reaction are usually employed after thorough purification. In addition, monomers employed for polymerization are also used after purification as needed. Impurities brought by a reaction container are also taken into account. Anyway, it is important to regulate a molar ratio of the mono-organo lithium compound to the compound having two vinyl groups directly bonded to a benzene ring to approximate to 2/1. The concentration of the dilithium compound obtained by the reaction can be determined as needed, but 0.0001 to 0.1 mole/liter is preferred. At a concentration less than this lower limit, fluctuations due to impurities become large. At a concentration greater than this upper limit, reaction does not proceed uniformly. Concentrations outside the above range are therefore not preferred. The dilithium polymerization initiator prepared within this concentration range can be employed after diluted with a nonpolar hydrocarbon solvent as needed.

The dilithium polymerization initiator solution thus obtained can be used as is for polymerization of a conjugated diene monomer, aromatic vinyl compound monomer or another anionic polymerizable monomer. By this polymerization, a homopolymer, block copolymer or random copolymer can be obtained. Typical examples of these monomers include, as a conjugated diene, butadiene, isoprene, 2-ethyl-1,3-butadiene, 2,3-dimethyl-1,3-butadiene, 1,3-pentadiene and 1,3-cyclohexadiene; as an aromatic vinyl compound, styrene, α-methylstyrene, p-methylstyrene, m-methylstyrene, o-methylstyrene, p-tert-butylstyrene, divinylbenzene, 1,1-diphenylethylene and vinyl naphthalene; and, as another monomer, (meth) acrylates, vinylpyridine and ε-caprolactone.

Anionic polymerization by using the dilithium polymerization initiator solution of the invention is conducted under ordinary polymerization conditions, more specifically, at 0 to 120° C. Polymerization of a conjugated diene at a higher temperature tends to readily generate a gel owing to a branched structure, though it produces a polymer poor in a 1,2-vinyl structure. Lower temperatures, on the other hand, retard the polymerization rate. The amount of each of the dilithium polymerization initiator and monomer is determined by the molecular weight of the polymer to be produced, viscosity of the polymer solution, collecting method of the polymer or the like.

Upon polymerization of a conjugated diene, a polar substance is unnecessary. If polymerization of an aromatic vinyl compound follows polymerization of a conjugated diene, addition of a small amount of a polar substance is required. Examples of the polar substance include ether compounds such as THF, diethoxypropanes, glyme and diglyme, and tertiary amines such as triethylamine and tetramethylethylene diamine. Of these, THF is preferred.

Polymerization of a block copolymer using a dilithium polymerization initiator is conducted by one of the following two methods: polymerization by successively adding monomers and polymerization utilizing a reactivity ratio of monomers. In the latter method, for example, a conjugated diene and an aromatic vinyl compound are charged simultaneously in a reactor containing a dilithium polymerization initiator. First, polymerization of the conjugated diene occurs. Then, a copolymerized portion of the conjugated diene and aromatic vinyl compound is formed, followed by the formation of a homopolymer of the aromatic vinyl compound. Accordingly, the block copolymer obtained using the dilithium polymerization initiator has a conjugated diene polymer block at the center and a homopolymer block of the aromatic vinyl compound at the terminal. The block copolymer obtained by using the dilithium polymerization initiator of the invention in accordance with this method differs from a block copolymer obtained using a conventional dilithium polymerization initiator prepared in the presence of a polar substance in that a portion of the random copolymer becomes smaller and a portion of the homopolymer of an aromatic vinyl compound (a portion which can be detected and determined as the homopolymer of an aromatic vinyl compound by osmic acid decomposition) becomes larger. Accordingly, the invention is characterized by that a polymer having a high tensile strength can be obtained. Use of the dilithium polymerization initiator solution of the invention makes it possible to prepare a block copolymer of a conjugated diene, for example, a block copolymer of butadiene and 1,3-cyclohexadiene.

A (co)polymer obtained by using the dilithium polymerization initiator solution of the invention features its narrow molecular weight distribution. The (co)polymer usually has a molecular weight distribution of 1.0 to 1.3. In the case of a conjugated diene polymer, a conjugated diene polymer ranging from that having a 1,2-vinyl-bound content suppressed to the minimum to that having an increased 1,2-vinyl-bound content can be obtained because the polymerization initiator solution is free of a polar substance. In addition, in the case of a block copolymer, a block polymer thus obtained has excellent symmetrical property. The copolymer therefore has a high tensile strength.

The co(polymer) obtained by the polymerization using the dilithium polymerization initiator solution of the invention has, as both terminals thereof, a lithium anion terminal having polymerization activity. A telechelic polymer can be produced by chemically modifying these active both terminals. Chemical modification of the terminal of a polymer by reacting a lithium anion terminal having polymerization activity with a functional-group imparting compound is a known method. In the invention, production of a telechelic polymer may follow a known method. Specific examples of the functional-group imparting compound to be used for the production of a telechelic polymer include ethylene oxide, propylene oxide, carbon dioxide, methacrylic acid derivatives, divinylbenzene, iodine, ethylenediamine, diglycidylamino-containing compounds such as tetraglycidyl-1,3-bisaminomethylcyclohexane and tetraglycidylmethaxylenediamine, N-methyl-2-pytrrolidone and 1,3-dimethyl-2-imidazolidione. Reaction conditions may be the same as known conditions. For example, a reaction with ethylene oxide yields a telechelic polymer having a hydroxyl group at both terminals. A reaction with carbon dioxide and hydrolysis yield a polymer having a carboxylic acid group at both terminals. By this method, a polymer having less content of the 1,2-vinyl structure and having a functional group at both terminals can be synthesized.

According to the invention, a uniform dilithium polymerization initiator solution free of a polar substance such as amine can be obtained and, by the use of this solution as it is, a polymer having narrow molecular weight distribution can be easily prepared without the need of forming an oligomer as required in the conventional process.

The present invention will be illustrated in greater detail with reference to the following Examples, but the invention should not be construed as being limited thereto.

The solvent, 1,3-diisopropenylbenzene, durene and monomer were purified by dehydration using a metal sodium, metal potassium, tert-butyl lithium or oligomer lithium and distillation under high vacuum conditions. Tetraphenylethylene was purified by conducting recrystallization and sublimation in repetition. In particular, the consumption of the monomer by polymerization reaction was suppressed by conducting distillation speedily. The concentration of tert-butyl lithium in the purchased cylohexane solution (product of FLUKA) of tert-butyl lithium was determined from the UV absorption spectrum of the active terminal of the polymerized styrene.

EXAMPLE 1

Synthesis of a Dilithium Polymerization Initiator by Using Durene

The following test was conducted in order to confirm the formation of a dilithium polymerization initiator in the presence of durene. By using a high vacuum line, 1,3-diisopropenylbenzene (which is hereinafter abbreviated as "DIB") and tert-butyl lithium (which is hereinafter abbreviated as "t-BuLi") were reacted at room temperature. In a cyclohexane solvent, the final concentration of durene was 0.5 mole/liter (the mole/liter of the concentration unit is hereinafter abbreviated as "M") and that of DIB w as $5 \times 10^{-4}$ M. The t-BuLi and DIB were used at a molar ratio of 2:1.

Observation of the reaction by using ultraviolet absorption spectrum revealed that absorption at the ultraviolet portion of 310 nanometer (nm) increased with the passage of time and reached almost saturation after 140 hours. This absorption at 310 nm indicates the absorption of diisopropenylbenzene-dilithium in cyclohexane so the formation of diisopropenylbenzene-dilithium was confirmed. It is described in the report of Lutz, et al. (Eur. Polymer J. 15, 1111–1117 (1979)) that this absorption at 310 nm indicates absorption of diisopropenylbenzene-dilithium in cyclohexane.

EXAMPLE 2

Synthesis of a Dilithium Polymerization Initiator by Using Tetraphenylethylene The test to confirm the formation of a dilithium polymerization initiator in the presence of tetraphenylethylene was conducted in the following manner. By using a high vacuum line, DIB and t-BuLi were reacted at 45° C. In a cyclohexane solvent, the final concentration of tetraphenylethylene (TPhE) was $2.1 \times 10^{-3}$ M and that of DIB was $5 \times 10^{-4}$ M. The t-BuLi and DIB were used at a molar ratio of 2:1. The absorption at the ultraviolet portion of 310 nanometer (nm) indicating absorption of diisopropenylbenzene-dilithium in cyclohexane increased with the passage of time, reaching almost saturation after about 30 hours. EXAMPLE 3

The average number of functional groups of the polymerization initiator synthesized as in Example 1 was determined in the following manner.

In the presence of the thus-synthesized polymerization initiator solution, butadiene was added at a reaction temperature maintained at 40° C. to cyclohexane. At a butadiene concentration of 0.02 M, butadiene was polymerized, whereby a butadiene oligomer having at both terminals thereof a lithium atom was synthesized.

Then, a 2 equivalent/Li of a dry ethylene oxide gas was introduced into the reaction mixture at room temperature under stirring. After the resulting mixture was allowed to stand for 24 hours at room temperature, a 1N aqueous HCl solution was added to neutralize the mixture. After washing with water, the organic layer was collected by separation. The organic layer was subjected to thin-film distillation to remove the solvent, whereby a viscous liquid was obtained. The hydroxyl value of this liquid was measured in accordance with the method of JIS K 0070-1992. As a result of measurement, the hydroxyl number was 1.97/molecule, indicating that the average number of the functional groups of this polymerization initiator was 1.97/molecule.

By using the synthesized polymerization initiator solution, SBS was polymerized into a block polymer. Upon polymerization, a small amount (3 wt. %) of THF was added after completion of the polymerization of butadiene, followed by polymerization of styrene.

The molecular weight and molecular weight distribution of the resulting polymer are shown in a Table below.

|  | Number-average molecular weight Value measured by GPC | Molecular weight distribution Mw/Mn |
| --- | --- | --- |
| SBS | 52700 | 1.10 |

According to Proton NMR, the polybutadiene portion has been found to have the following microstructure: the 1,2-vinyl-bound content was 8%, 1,4-cis structure was 39% and 1,4-trans structure was 53%.

The tensile strength of the resulting SBS block copolymer was measured in accordance with JIS K 6251, resulting in a tensile strength as high as 250 (kg/cm$^2$)

EXAMPLE 4

The average number of the functional groups of the polymerization initiator synthesized as in Example 2 was determined in the following manner.

In the presence of the thus synthesized polymerization initiator solution, a butadiene oligomer was synthesized as in Example 3. It was then reacted with an ethylene oxide gas. The hydroxyl number of the resulting liquid product was measured, resulting in that the average number of the functional groups of this polymerization initiator was 1.95/molecule.

In a similar manner to Example 3, SBS was polymerized into a block polymer. The molecular weight and molecular weight distribution of the resulting polymer are shown in a Table below.

|  | Number-average molecular weight Value measured by GPC | Molecular weight distribution Mw/Mn |
| --- | --- | --- |
| SBS | 53200 | 1.12 |

According to proton NMR, the polybutadiene portion has been found to have the following microstructure: the 1,2-vinyl-bound content was 8%, 1,4-cis structure was 39% and 1,4-trans structure was 53%.

The tensile strength of the resulting SBS block copolymer was measured in accordance with JIS K 6251, resulting in a tensile strength as high as 240 (kg/cm$^2$).

COMPARATIVE EXAMPLE 1

A dilithium polymerization initiator was synthesized under similar conditions to Example 1 except that durene was not used. As a result of measurement, the average number of the functional groups of the resulting polymerization initiator solution was found to be 1.30/molecule.

In a similar manner to Example 3, SBS was polymerized into a block polymer. The molecular weight and molecular weight distribution of the resulting polymer are shown in a Table below.

|  | Number-average molecular weight Value measured by GPC | Molecular weight distribution Mw/Mn |
|---|---|---|
| SBS | 210000 | 1.82 |

The resulting polymer has been found to have a high molecular weight and wide molecular weight distribution, which owes to that the average number of the functional groups of the dilithium polymerization initiator employed in this example is small and the lithium polymerization initiator thus obtained is not uniform and has a complex form. According to proton NMR, the polybutadiene portion has been found to have the following microstructure: the 1,2-vinyl-bound content was 8%, 1,4-cis structure was 39% and 1,4-trans structure was 53%.

The tensile strength of the resulting polymer was measured as in Example 3, resulting in a tensile strength as markedly low as 50 (kg/cm$^2$). This suggests that since the average number of the functional groups of the polymerization initiator was low, the resulting polymer contained a polymer having a diblock structure and the like.

COMPARATIVE EXAMPLE 2

Under similar conditions to Example 1 except that a dilithium polymerization initiator was synthesized in the presence of 1×10$^{-2}$ M triethylamine instead of durene. By using this polymerization initiator solution, SBS was polymerized as in Example 3.

The molecular weight and molecular weight distribution of the resulting polymer are shown in a Table below.

|  | Number-average molecular weight Value measured by GPC | Molecular weight distribution Mw/Mn |
|---|---|---|
| SBS | 73000 | 1.30 |

According proton NMR, the polybutadiene portion has been found to have the following microstructure: the 1,2-vinyl-bound content was 16%, 1,4-cis structure was 35% and 1,4-trans structure was 49%. Compared with the block copolymer obtained in Example 3, the block copolymer obtained here has wide molecular weight distribution and in addition, owing to the existence of amine, the polymer has a high vinyl content.

In addition, the tensile strength of the resulting polymer was measured as in Example 3, resulting in 180 (kg/cm$^2$).

INDUSTRIAL APPLICABILITY

Use of the dilithium polymerization initiator solution of the invention makes it possible to produce a block copolymer having narrow molecular weight distribution and excellent symmetrical property or a telechelic polymer having, equally at both terminals thereof, functional groups. Since no nitrogen- or oxygen-containing polar substance which restricts the bonding structure of a conjugated diene polymer is added to the dilithium polymerization initiator solution of the invention, a polymer varied in a 1,2-vinyl-bound content, ranging from that having a 1,2-vinyl-bound content suppressed to the minimum to that having an increased 1,2-vinyl-bound content, can be obtained by adding a sufficient amount of a polar substance as needed. Moreover, since the dilithium polymerization initiator solution of the invention is free of a nitrogen-containing polar substance, a polymer solution obtained using it can be provided as is to the hydrogenation reaction in which a catalyst which will otherwise be damaged by the polar substance is employed.

What is claimed is:

1. A polymerization initiator solution, which comprises a dilithium polymerization initiator having an average number of functional groups of from 1.8 to 2.0/molecule, at least one compound selected from the group consisting of benzene compounds substituted with at least three alkyl groups and 1,1-diphenyl-substituted ethylene compounds and a solvent selected from aliphatic hydrocarbon compounds and alicyclic compounds, and which free of a polar substance and a conjugated diene.

2. A process for producing a polymerization initiator solution which comprises a dilithium polymerization initiator having an average number of functional groups of from 1.8 to 2.0/molecule and a solvent selected from aliphatic hydrocarbon compounds and alicyclic compounds, and which is free of a polar substance, which process comprises reacting, in a solvent selected from aliphatic hydrocarbon compounds and alicyclic compounds, a mono-organo lithium compound and a compound having two vinyl groups directly bonded to a benzene ring in the presence of at least one compound selected from benzene compounds substituted with at least three alkyl groups and 1,1-diphenyl-substituted ethylene compounds.

3. The process according to claim 2, wherein the benzene compound substituted with at least three alkyl groups is 1,2,4,5-tetramethylbenzene (durene) or hexamethylbenzene and the 1,1-diphenyl-substituted ethylene compound is tetraphenylethylene.

4. The process according to claim 2, wherein the compound having two vinyl groups directly bonded to a benzene ring is 1,3-diisopropenylbenzene or divinylbenzene.

5. A process for producing a co(polymer), which comprises (co)polymerizing a conjugated diene, or a conjugated diene and an aromatic vinyl compound, in a nonpolar hydrocarbon solvent using a polymerization initiator solution as claimed in claim 1.

6. A (co)polymer obtained by a process as claimed in claim 5, wherein the (co)polymer has a molecular weight distribution of 1.12 or less.

7. A telechelic polymer obtained by reacting a functional-group-imparting compound with an active terminal of a (co)polymer obtained by a process as claimed in claim 5, wherein the telechelic polymer has a molecular weight distribution of 1.12 or less.

* * * * *